United States Patent
Hobbs et al.

(10) Patent No.: US 9,887,581 B2
(45) Date of Patent: Feb. 6, 2018

(54) CONNECTIVITY IN AN ENERGY GENERATION NETWORK

(71) Applicant: SolarCity Corporation, San Mateo, CA (US)

(72) Inventors: Tara Elizabeth Hobbs, San Francisco, CA (US); Eric Daniel Carlson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 398 days.

(21) Appl. No.: 14/808,155

(22) Filed: Jul. 24, 2015

(65) Prior Publication Data

US 2016/0336747 A1 Nov. 17, 2016

Related U.S. Application Data

(60) Provisional application No. 62/162,477, filed on May 15, 2015.

(51) Int. Cl.
*H02J 3/00* (2006.01)
*H02J 13/00* (2006.01)

(52) U.S. Cl.
CPC ....... *H02J 13/0013* (2013.01); *Y02E 60/7807* (2013.01); *Y04S 40/12* (2013.01)

(58) Field of Classification Search
CPC ... H02J 13/0013; Y02E 60/7807; Y04S 40/12
See application file for complete search history.

(56) References Cited

U.S. PATENT DOCUMENTS

| | | | | |
|---|---|---|---|---|
| 2007/0271006 A1* | 11/2007 | Golden | ..................... | H02J 3/14 700/295 |
| 2009/0283129 A1* | 11/2009 | Foss | ..................... | H02M 7/493 136/244 |
| 2010/0241375 A1* | 9/2010 | Kumar | .............. | H01L 31/02021 702/62 |
| 2011/0047370 A1* | 2/2011 | Nagel | ................. | H04L 12/2836 713/150 |
| 2011/0202185 A1* | 8/2011 | Imes | ..................... | F24F 11/006 700/277 |
| 2012/0036250 A1* | 2/2012 | Vaswani | ................ | G01D 4/004 709/224 |
| 2012/0054125 A1* | 3/2012 | Clifton | ................... | G05B 15/02 705/412 |

(Continued)

*Primary Examiner* — Philip Chea
*Assistant Examiner* — Wuji Chen
(74) *Attorney, Agent, or Firm* — Kilpatrick Townsend & Stockton LLP

(57) ABSTRACT

Techniques for managing connections within an energy generation network may be provided. Real-time data associated with network-connected energy generation devices at a location may be collected to determine communication channels between the devices. If it is determined that an inverter of the network is solar-powered, a wizard application may be launched to help a technician determine whether a meter will lose connectivity with a gateway device. The wizard application may provide instructions to power down the inverter. Once the inverter is powered down, it may be determined whether the metering device has lost its network connection with the gateway. If so, an instruction to install a repeater device during the installation may be provided.

13 Claims, 9 Drawing Sheets

(56) References Cited

U.S. PATENT DOCUMENTS

2012/0161523 A1* 6/2012 Kim .................. H02J 13/0075
307/66
2015/0365007 A1* 12/2015 Kaukojarvi ............... H02J 3/26
363/148

* cited by examiner

CONNECTIVITY IN AN ENERGY GENERATION NETWORK

CROSS-REFERENCES TO RELATED APPLICATIONS

The present application claims the benefit of and priority to U.S. Provisional Application No. 62/162,477, filed May 15, 2015, the entire contents of which is incorporated herein by reference for all purposes.

BACKGROUND

In recent years, climate awareness and the cost of energy has increased to the point that many consumers have begun to install renewable energy generation systems at both residential and non-residential locations. Solar photovoltaic (PV) systems, for example, have become relatively popular and can be connected to network accessible communication devices. Often, the PV systems will include an inverter and a meter that can both be network accessible. Additionally, the meter may utilize the inverter for communicating usage data to a service provider through the network. However, if the inverter is powered by the PV cells, this can cause metering challenges when the PV cells are not active, for example at night when there is no PV energy to generate.

BRIEF SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
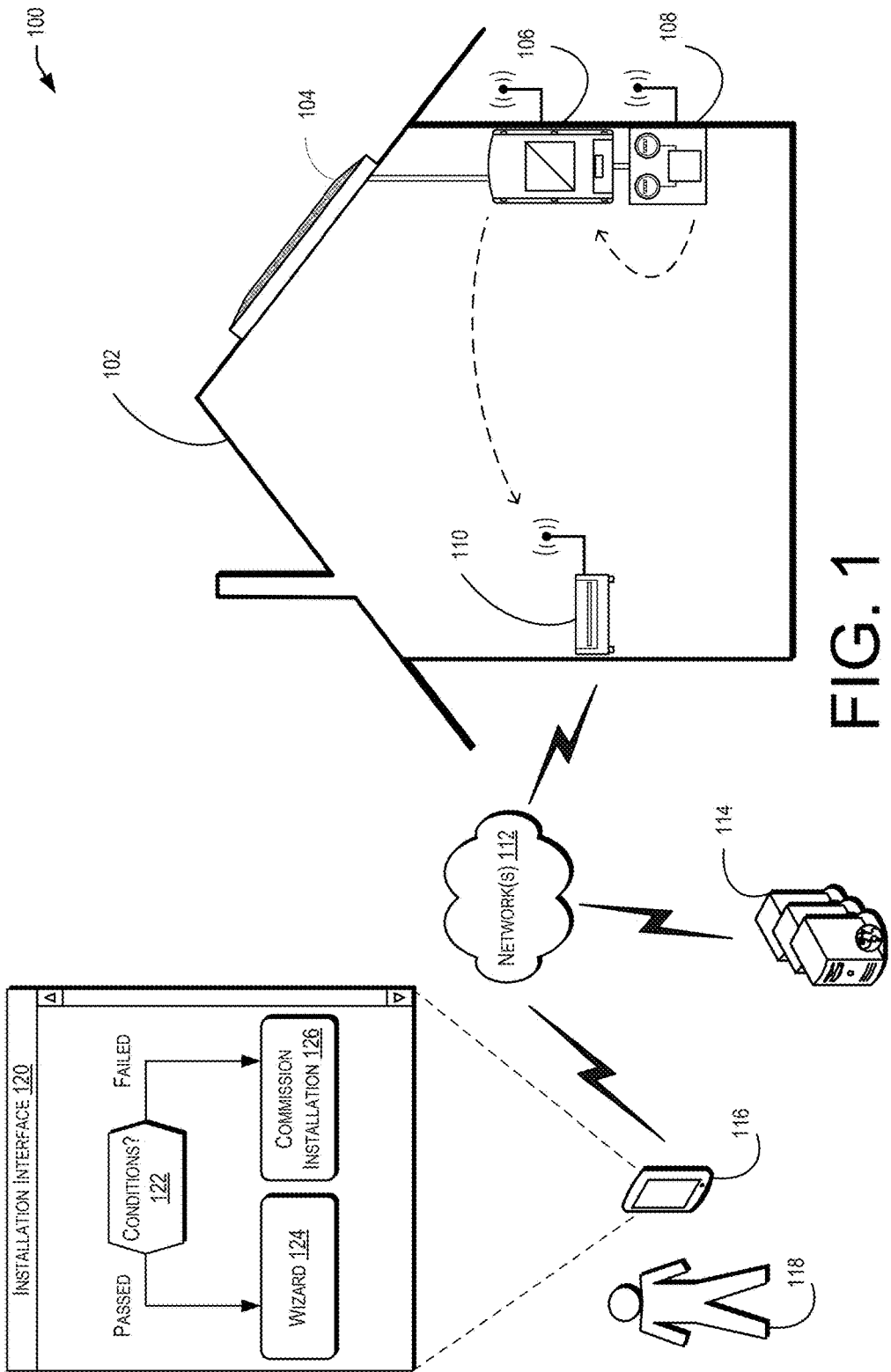
FIG. 1 is a simplified block diagram illustrating an example architecture and environment for managing connectivity in an energy generation network as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples of the present disclosure are directed to, among other things, managing connectivity in an energy generation network. In particular, an energy generation system may include one or more devices installed at a site for facilitating or otherwise enabling the generation, usage, and/or storage of energy via one or more energy generation, collection, or metering devices. Energy generation devices may include PV cells (e.g., solar panels) or the like that can collect sunlight and convert the sunlight into electricity. The electricity produced by the PV cell may be direct current (DC) electricity, and thus many systems are equipped with a power inverter (solar inverter) configured to convert the DC electricity into alternating current (AC) electricity for use by most household appliances. Additionally, the energy generation system may also be equipped with one or more metering devices that may be configured to track (meter) the amount of electricity generated by the solar array and/or the amount of electricity used at the site.

In some examples, a power inverter may be AC-powered, in that it may receive AC power directly from its connection to the electrical system at the site (e.g., that may it receives energy that may not be generated by the PV system). Such AC-powered inverters may also be active, even though they may not have any electricity to convert when the PV cell is not generated electricity from the sunlight. However, in other examples, a power inverter may be DC-powered, in that it may be powered by a battery or other DC source. Often times, that DC source that powers the invertor may be the PV cell itself. This is a logical choice, as it may not make sense to have the inverter active while the PV cell is inactive anyway. However, in a network-connected energy generation system, this may cause communication problems for certain metering devices.

In at least one non-limiting example, an energy generation inverter (e.g., a power inverter) and a metering device at a particular site may be network connected. That is, they may each include one or more antennas and/or transceivers for communicating with one another over a network (e.g., using ZigBee, Bluetooth, Wi-Fi, or the like). The site may also be equipped with one or more gateway devices, which may also include one or more antennas and/or transceivers. The gateway device may be capable of receiving information from the metering device and/or the inverter via a wireless network established between them. The gateway may also be connected to a greater (wide area) network (e.g., the Internet) for communicating data from the metering device and/or the inverter to a server computer of a service provider. In some examples, the service provider may be capable of processing the data received from the gateway device, analyzing energy generation information from the site as well more specifically for the network-connected devices. The service provider may also be configured to control the network-connected devices by sending control signals to the gateway device (which, in turn, can transmit those signals to the devices).

In many instances, the metering device may communicate with the gateway device via the inverter. In other words, data packets sent from the metering device to the gateway may be routed through the inverter, where the inverter communicates the packets from the metering device to the gateway on behalf of the metering device. This may happen for several reasons, one of which being the strength of the radio and/or transceiver of the inverter being stronger than that of the metering device. Another possible reason may be that the location of the respective devices makes it more advantageous for the inverter to communicate directly with the gateway. In any case, whether it is necessary or optimal, or neither, the metering device may not communicate directly with the gateway. As such, if the inverter is solar-powered, then the metering device may lose its network connection with the gateway when the inverter loses power (e.g., at night, under heavy cloud cover, or at any other time that the PV is not generating electricity). While the metering device may be capable of identifying that it lost its network connection with the gateway, and possibly establishing a direct connection with the gateway, there is not guarantee that this will occur. In such cases, a repeater or other range extending device may be utilized to connect the gateway with the metering device.

Further, in some examples, an installation technician may be in the process of installing an energy generation system as described above at a site of a customer. Based on several factors (conditions), the technician may want to know whether a repeater device should also be installed at the site. Utilizing a software tool (e.g., a mobile application or the like), the technician may determine whether or not to install the repeater prior to commissioning (finalizing) the installation. The software tool may communicate with a service provider (e.g., via a server computer) to receive and/or provide data about the devices installed at the site. In some cases, a wizard module or other part of the software tool may walk the technician through a series of steps to enable such a determination. The software tool may then instruct the technician to commission the installation, or to install the desired repeater prior to commissioning the installation. In some examples, a wizard module or wizard application is any software application, module, routine, or sub-routine configured to guide a user through a series of steps (workflow) to arrive at one or more different outcomes. The wizard may be part of an existing application or it may be its own application that is launched in particular situations.

While examples are given with specific numbers or types of example energy generation devices, any number or type of energy generation systems may be utilized without departing from the embodiments described herein. For example, while the service provider may be described as using a cloud-based or other type of server computing device, it should be understood that any computing system (including a handheld device), or combination of computing devices, may be used to manage the connectivity of devices within an energy generation network. Further, while PV cells are described as the source of the energy generation, any type of energy generation system may be managed similarly.

FIG. 1 illustrates an example environment 100 for implementing features of the present disclosure. In the example environment 100, a site 102 (e.g., a house, a commercial building, a public or private structure, etc.) may be equipped with one or more PV cells 104 (PV array), an energy generation inverter 106 (e.g., a power inverter), and a metering device 108. As noted, the inverter 106 may be configured to convert the DC electricity generated by the PV cells 104 into AC electricity for use by appliances, devices, etc., at the site 102. Additionally, each of the inverter 106 and/or the metering device 108 may be equipped with antennas and/or transceivers for wirelessly communicating with one another and/or with a gateway device 110 at the site 102. The gateway device 110 may also be equipped with an antenna and/or a transceiver for wirelessly communicating with other devices at the site 102 or other sites. However, the gateway 110 may also include one or more wired connections (e.g., an Ethernet connection or the like) for accessing one or more external networks 112.

The network 112 may include any one or a combination of many different types of networks, such as cable networks, the Internet, wireless networks, powerline networks, cellular networks, satellite networks, other private and/or public networks, or any combination thereof. By accessing the network 112, the gateway may be able to communicate with one or more server computers 114 of a service provider. The service provider may provide software and/or hardware support for installing, accessing, managing, or otherwise operating PV systems and/or energy generation networks (such as seen at site 102, where the PV system includes devices that are network accessible). In some examples, a mobile device 116 or other computing device may also be able to access the networks 112, enabling mobile and/or technician access to the data provided by the gateway 110, the inverter, 106, and/or the metering device 108.

In at least one example, a technician 118 (e.g., an employee or contractor of the service provider) may be responsible for installing, maintaining, or otherwise visiting the PV system at the site 102. Using the mobile device 116, the technician 118 may be able to access information about the devices 106, 108, 110 at the site 102 and/or provide instructions to those devices 106, 108, 110. The technician 118 may utilize the mobile device 116 (e.g., via a mobile application) to send a control signal to the gateway 110, instructing the gateway 110 to send data about the site 102 to the service provider computers 114 at a faster rate than normal (default). Control signals may also be sent to instruct the inverter 106 and/or the metering device 108 to send data to the gateway 110 (for subsequent transmission to the service provider computers 114) at the faster rate as well. For example, the default rate of data exchange between the gateway 110 and the service provider computers 114 (and/or between the devices 106, 108 and the gateway 110) may be set at once a day, twice a day, once an hour, etc. However, this would not provide for real-time analysis and would likely not be helpful to the technician 118 at the site 102. Thus, the control signal may instruct the site devices 106, 108, 110 to transmit appropriate data at a faster rate during the installation/maintenance process. The faster rate may be once a minute, once every 15 seconds, once a second, etc.

Thus, while the technician 118 is at the site 102, the technician 118 will not have to wait for default updates.

Prior to commissioning an installation (completing, finalizing, or otherwise verifying that the job is complete), the technician 118 may utilize an installation interface 120 of the mobile device 116. The installation interface 120 may be configured to provide a user interface (UI) for the technician 118 to enter and/or review data about the site 102. For example, the installation interface 120 may include a text entry portion, where specific information about the installation and/or configuration of devices 104, 106, 108 can be entered. Alternatively, drop-down options may be provided for identifying specific make and/or model numbers of the devices 104, 106, 108 installed at the site 102. The installation interface 120 may also enable the technician 118 to enter other information about the installation and/or for providing a list of conditions 122 that should be met in order for the installation to be complete (commissioned). The conditions 122 may include whether the inverter 106 is powered by the PV cells 104 or by AC electricity (e.g., whether the inverter is only powered by PV energy of the site 102 and is not powered by the grid), whether a metering device 108 was included in the installation or was already part of the energy generation network, and/or whether a number of network hops for data transmitted by the metering device 108 is non-zero or more than zero. In some cases, if all of the conditions have passed (the inverter 106 is solar-powered, the metering device 108 is installed at the site 102, and the hop count is greater than zero), the installation interface 120 may instruct the technician 118 to utilize a wizard application 124. However, if any of the conditions have failed, the installation interface 120 may instruct the technician to commission the installation 126 without using the wizard 124. In some cases, the wizard 124 may be a separate application on the mobile device, or it may be part of the same mobile application that implements the installation interface 120.

In some examples, the energy generation inverter 106 may be DC-powered and connected to the array 104 while another, second DC-powered inverter may be connected to a different PV array. In this example, the inverter 106 may be located closer to the gateway 110 and may be able to maintain a connection to the gateway 110 without relaying the signal through the second inverter. However, because the second inverter is farther from the gateway 110, the second inverter may utilize the inverter 106 to relay its signal to the gateway 110. As such, if the inverter 106 loses power earlier in the day than the second inverter, the second inverter may not be able to communicate with the gateway 110 because it has lost its connection through the inverter 106 that was acting as a relay.

Figure 2:
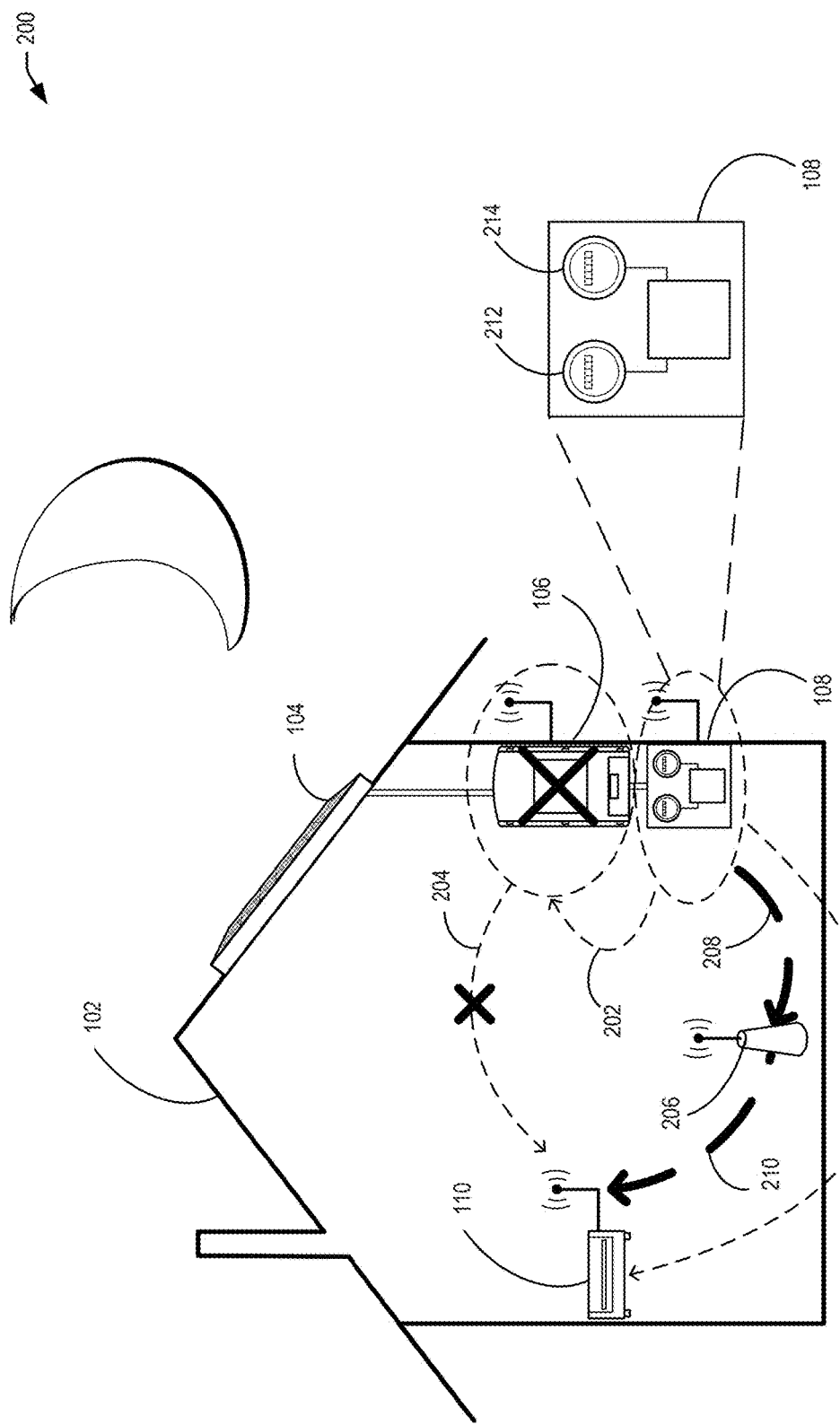
FIG. 2 is another simplified block diagram illustrating at least some features associated with managing connectivity in an energy generation network as described herein, according to at least one example.

FIG. 2 illustrates an example environment 200 for implementing additional features of the present disclosure. In example environment 200, the site 102 of FIG. 2 is shown again with similar features. Similar to as described with respect to FIG. 1, the site 102 may include a PV array 104 for generating DC electricity from light, an energy generation inverter 106 for converting the DC electricity into AC electricity, and/or a meter 108 for measuring the amount electricity produced by the PV array 104 and/or the amount of electricity used by the site 102 (e.g., used by electricity consumers at the site). As described, the meter 108 and the inverter 106 may include antennas for communicating wirelessly with a gateway device 110. The gateway 110 may be in communication with one or more service providers (e.g., via copy wiring, Ethernet cables, fiber optics, etc.) and/or one or more mobile devices (e.g., wirelessly).

In at least one example, the meter 108 may utilize the inverter 106 as an intermediate device (e.g., as a router) through which it may transmit its electricity usage and generation measurements to the gateway 110. In this example, there would be a hop count of one for the data being transmitted to the destination (e.g., the gateway 110). The dashed line 202 illustrates the data being transmitted from the meter 108 to the inverter 106, the dashed line 204 illustrates the data being transmitted from the inverter 106 to the gateway 110, and the dashed line 205 illustrates data that may be transmitted from the meter 108 to the gateway 110. The extra step (e.g., the inverter 106) between the meter 108 and the gateway 110 is the "hop." In some examples, other hops may be used (e.g., if the gateway 110 is too far from the inverter 106). The gateway 110 can then transmit that data to a service provider or the like.

However, in some cases, the inverter 106 may not be AC-powered (e.g., plugged into an outlet) and may instead be solely DC-powered (e.g., powered by the PV array 104). In this example, when the PV array 104 is not active (e.g., at night), the inverter 106 may not be able to act as the router (hop) for the data from the meter 108. In other words, the connection 204 and/or the connection 205 may be lost or may not be possible. As such, the meter 108 may not be able to communicate the usage and/or production data to the gateway 110 during this time. While this may not be a problem regarding the production data (since no electricity is being produced at that time), the meter will also not be able to transmit usage data. One solution is to install a repeater 206 within the site 102 that can act as the hop in the place of the inverter 106. In other words, once it is determined that this problem exists (e.g., that the meter 108 cannot communicate with the gateway 110 while the PV array 104 is inactive), a repeater 206 may be used to recreate the connection 202, 204. Now, the meter 108 can communicate with the gateway 110 via connections 208, 210. It would not, however, be advantageous or cost effect to install a repeater 206 at every site, especially since one may not always be helpful. Similarly, when a technician is installing such a system, the technician may not know at the time whether this problem will occur when the PV array 104 is inactive (unless the installation is done at night). Similarly, even if the technician knows that the meter 108 is using the inverter 106 as a router, the technician still won't know whether the particular configuration and placement of devices at the site 102 would be able to work without a repeater 206 (e.g., the meter 108 may be capable in some examples to find the gateway 110 and directly communicate with it). Thus, the use of the wizard application described briefly with respect to FIG. 1 will be very valuable.

Additionally, FIG. 2 illustrates two different sub-meters of meter 108. For example, the meter 108 may include a first sub-meter 212 that measures how much solar energy (DC electricity) is being produced by the PV array 104. Additionally, the meter 108 may also include a second sub-meter 214 that measures how much energy is being used by the site 102 (e.g., on a minute-by-minute basis). Additionally, any number of meters could be used and impacted.

Figure 3:
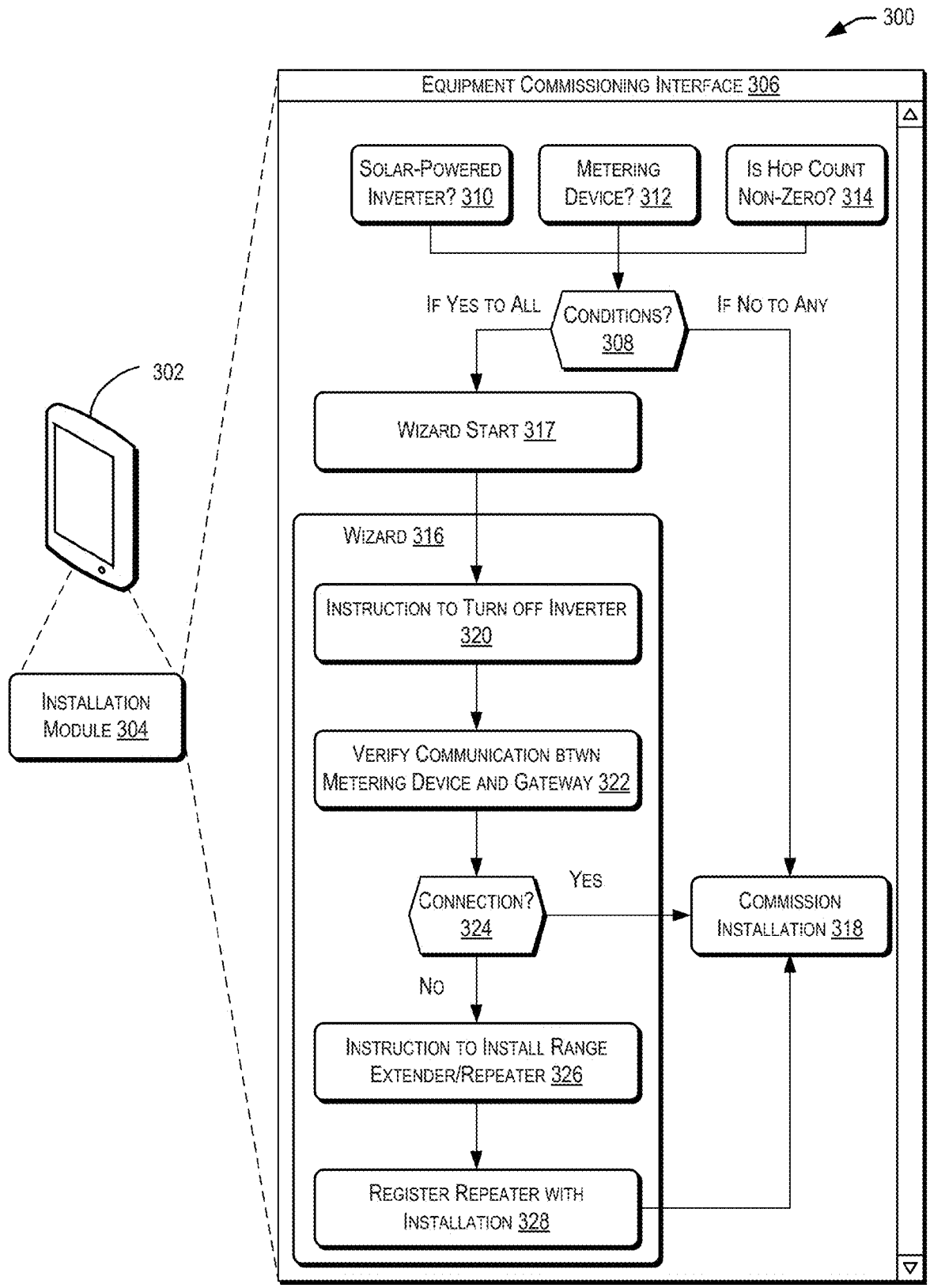
FIG. 3 is another simplified block diagram illustrating at least some additional features associated with managing connectivity in an energy generation network as described herein, according to at least one example.

FIG. 3 is a simplified block diagram of environment 300 according to an embodiment of the present disclosure. As shown, environment 300, a mobile device 302 may be configured with one or more software applications (e.g., an installation module 304). The installation module 304 may be configured to be utilized before, during, and/or after installation of an energy generation network similar to that described with respect to FIGS. 1 and 2. For example, the installation module 304 may be configured to provide and/or receive data to and/or from, respectively, a service provider or directly with a gateway device at the site of the installation. The installation module 304 may be configured to provide a control signal that can be sent to the gateway devices described above and/or the other energy generation devices (e.g., inverter, meter, etc.) to instruct those devices to provide more frequent data than normal (or at least more than the default amount of data). Additionally, the installation module 304 may be configured to provide one or more UIs for interaction with a technician or other user at the installation site.

One of the UIs available to the installation module 304 is the equipment commissioning interface 306 shown in FIG. 3. In some examples, the equipment commissioning interface 306 may be configured to guide the technician through commissioning and finalizing the installation. As shown, the equipment commissioning interface 306 may provide an interface for receiving information from the technician about the particular configuration of the installation. This information can then be used to determine whether the appropriate conditions 308 are met, which can be used to determine whether to instantiate the wizard application or whether to instruct the technician to commission (complete, finalize, etc.) the installation. As noted, the equipment commissioning interface 306 may ask the technician a set of questions to determine whether the conditions 308 are met. The questions can be asked in any order and in any manner (e.g., via drop-down selection, entrance of text, radio buttons, icon selection, etc.). The questions may include whether the inverter is solar-powered 310, whether the metering device exists in the network 312, and whether the hop count of the data received from the meter is non-zero 314. In some cases, a make or model number (or other identifier) of the inverter may be utilized to determine whether the inverter is solar-powered. The hop count of the data received from the meter may be detected by examining the metadata or other information associated with the data that indicates that path that the data took from the meter to the gateway while the inverter was powered on.

In some examples, if all of the conditions are met (e.g., the inverter is solar-powered, the meter exists in the network, and the hop count is non-zero) at 308, the wizard 316 may be started (instantiated) at 317. Otherwise, if any of the conditions are not met, the equipment commissioning interface 306 may instruct the technician to continue commissioning the installation at 318 (e.g., without ever presenting the wizard 316). However, when the wizard 316 is instantiated at 317, one or more other instructions and/or interfaces may be provided to the technician. For example, the first step of the wizard 316 may be to provide an instruction to turn off (power off) the inverter at 320. The instruction may be text or audio presented to the technician via the equipment commissioning interface 306 or the instruction may be a control signal sent from the mobile device 302 to the inverter itself. At 322, the wizard 316 may include verifying that communication between the metering device and the gateway still exists. The verification may be performed manually by the technician or the mobile device 302 may request such information from the service provider. At 324, if the wizard 316 determines that the connection between the meter and the gateway still exists, the wizard 316 may instruct the technician to commission the installation at 318. In this case, there is no need for the repeater as the meter is still able to communicate with the gateway even when the inverter is powered off. However, if wizard 316 determines that the connection is lost at 324, the wizard 316 may instruct the technician to install the repeater at 326. Further, the wizard 316 may request that the technician enter an identifier for the repeater so that the repeater can be registered with the installation at 328. The identifier may be entered via a user interface of the wizard 316 or utilizing a scanner or other image capture instrument of the mobile device 302. The mobile device 302 may then provide the identifier of the repeater to a service provider that manages the devices at the site). Once the repeater is installed and registered, the wizard 316 may instruct the technician to commission (or finish commissioning) the installation at 318, thus ending the wizard 316.

Figure 4:
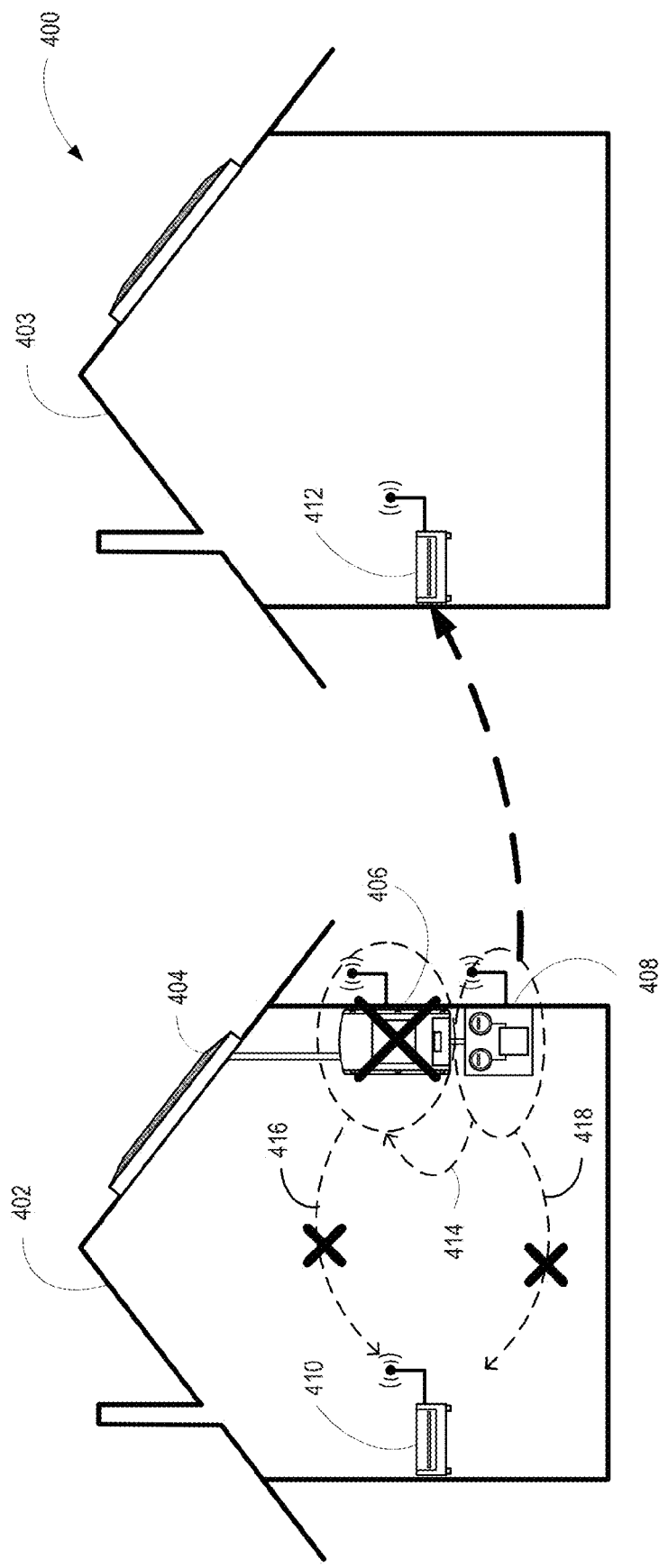
FIG. 4 is another simplified block diagram illustrating at least some additional features associated with managing connectivity in an energy generation network as described herein, according to at least one example.

FIG. 4 illustrates another example environment 400 for implementing additional features of the present disclosure. In example environment 400, a site 402 and a neighboring site 403 are shown with features similar to site 102 of FIGS. 1 and 2. Similar to as described with respect to FIG. 1, the site 402 may include a PV array 404 for generating DC electricity from light, an energy generation inverter 406 for converting the DC electricity into AC electricity, and/or a meter 408 for measuring the amount electricity produced by the PV array 404 and/or the amount of electricity used by the site 402 (e.g., used by electricity consumers at the site). The meter 408 and the inverter 406 may include antennas for communicating wirelessly with a gateway device 410 of site 402 and/or a gateway device 412 of site 403. The gateways 410, 412 may be in communication with one or more service providers (e.g., via copy wiring, Ethernet cables, fiber optics, etc.) and/or one or more mobile devices (e.g., wirelessly).

In at least one example, the meter 408 may utilize the inverter 406 as an intermediate device (e.g., as a router) through which it may transmit its electricity usage and generation measurements to the gateway 410. In this example, there would be a hop count of one for the data being transmitted to the destination (e.g., the gateway 410). The dashed line 414 illustrates the data being transmitted from the meter 408 to the inverter 406, the dashed line 416 illustrates the data being transmitted from the inverter 406 to the gateway 410, and the dashed line 418 illustrates data that may be transmitted from the meter 408 to the gateway 410. The extra step (e.g., the inverter 406) between the meter 408 and the gateway 410 is the "hop." In some examples, other hops may be used (e.g., if the gateway 410 is too far from the inverter 406). The gateway 410 can then transmit that data to a service provider or the like.

However, in some cases, the inverter 406 may not be AC-powered (e.g., plugged into an outlet) and may instead be DC-powered (e.g., powered by the PV array 404). In this example, when the PV array 404 is not active (e.g., at night), the inverter 406 may not be able to act as the router (hop) for the data from the meter 408. In other words, the connection 416 and/or the connection 418 may be lost or may not be possible. As such, the meter 408 may not be able to communicate the usage and/or production data to the gateway 410 during this time. In some examples, however, the meter 408 may identify that it has lost connection with the gateway 410 and may begin searching for another router to be utilized for communicating with the service provider. If the neighboring site 413 is close enough to the meter 408, the meter 408 may open a communication channel with the gateway 412 of the site 403 and may be able to continue sending meter data to the service provider. Additionally, in some examples, the wizard application described above may instruct the meter 408 to search for and/or connect with the gateway 412 of the neighboring site 403 when it is determined that the connection with the gateway 410 of the site 402 is lost. In this way, the technician may not need to install a repeater at the installation even though the problem identified above (e.g., the inverter is solar-powered, and the meter uses the inverter as a router) is expected to occur at site 402. Other examples include verifying, after the inverter 406 has been powered off, that the meter 408 is able to access the service provider via the gateway 412 of the site 403. Additionally, any wired or wireless device of the neighboring site (not just a gateway device) may be used by the meter 408 as the router (creating the hop) for communicating with the service provider. As such, the wizard application may either verify the connection with the network device of the site 403 or it may simply verify that the meter 408 is able to provide data to the service provider (e.g., independent of which other device is being utilized as the hop).

Figure 5:
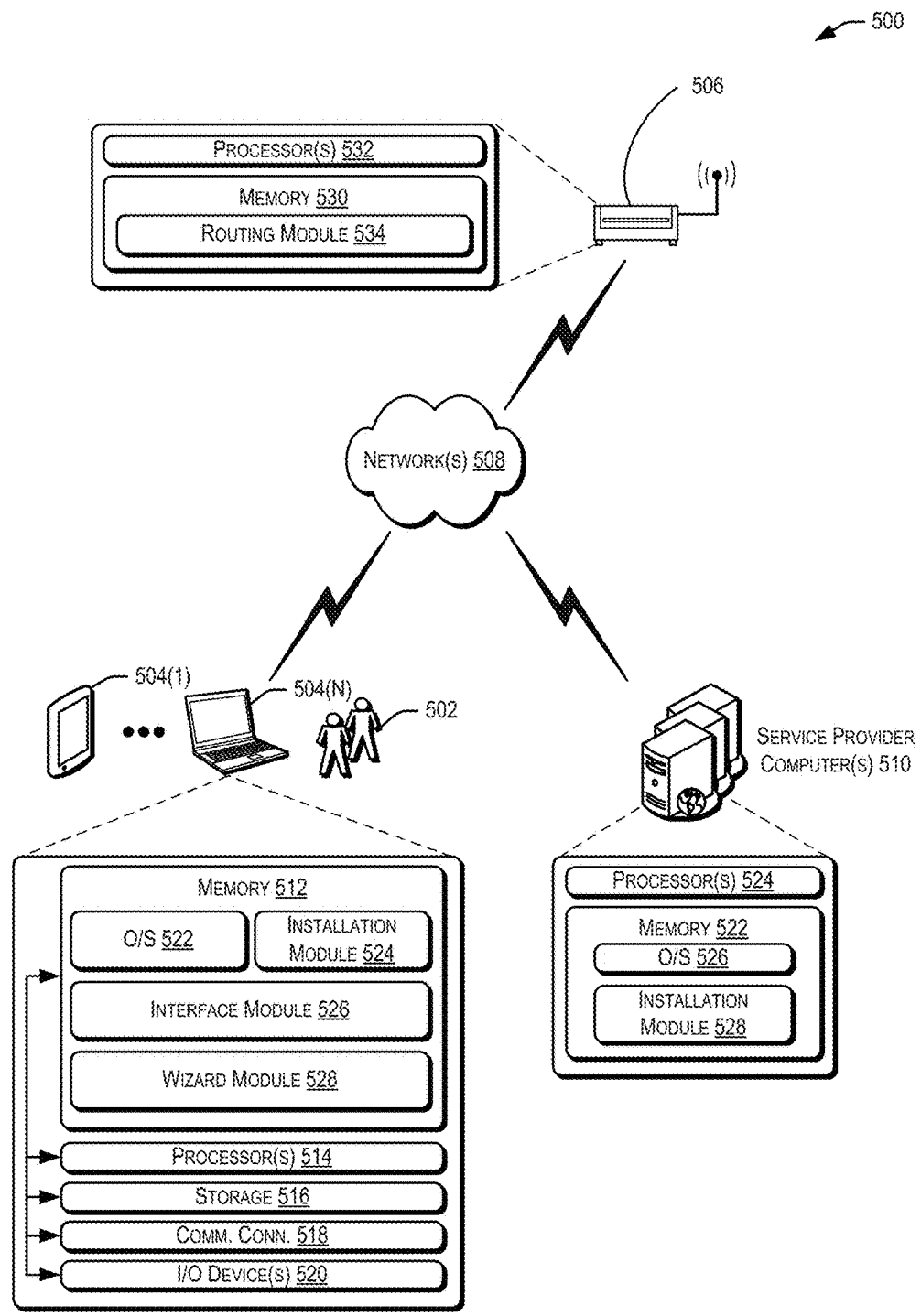
FIG. 5 is block diagram illustrating at least one system architecture associated with managing connectivity in an energy generation network as described herein, according to at least one example.

FIG. 5 illustrates an example architecture 500 for managing connections in an energy generation network described herein that includes service provider computers, one or more mobile devices, and/or gateway devices connected via one or more networks, according to at least one example. In architecture 500, one or more users 502 may utilize user computing devices 504(1)-(N) (collectively, user devices 504) to access data associated with one or more network-connected devices accessible to the gateway device 506, via one or more networks 508. In some aspects, the data may be collected and/or stored by one or more service provider computers 510. The one or more service provider computers 510 may, in some examples, provide access to the data received through the gateway device 506. The one or more service provider computer 510 may also be provide control signals to the gateway device 506 for controlling the network connected devices (e.g., an inverter, a meter, or a PV array that are wirelessly connected to the gateway).

In some examples, the networks 508 may include any one or a combination of many different types of networks, such as cable networks, the Internet, wireless networks, cellular networks and other private and/or public networks. While the illustrated example represents the users 502 accessing the service provider computers 510 via the mobile devices 502 over the networks 508, the described techniques may equally apply in instances where the users 502 interact with the service provider computers 510 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user device 504 may be any type of computing device such as, but not limited to, a mobile device, a smart phone, a personal digital assistant (PDA), a laptop computer, a desktop computer, a thin-client device, a tablet PC, etc. In some examples, the user devices 504 may be in communication with the service provider computers 510 via the networks 508, or via other network connections. Additionally, the user devices 504 may be part of a distributed system managed by, controlled by, or otherwise part of the service provider computers 210 (e.g., a console device or dedicated mobile unit integrated with the service provider computers 210).

In one illustrative configuration, the user devices 504 may include at least one memory 512 and one or more processing units (or processor(s)) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described. The user devices 504 may also include geo-location devices (e.g., a global positioning system (GPS) device or the like) for providing and/or recording geographic location information associated with the user devices 504.

The memory 512 may store program instructions that are loadable and executable on the processor(s) 514, as well as data generated during the execution of these programs. Depending on the configuration and type of user device 504, the memory 512 may be volatile (such as random access memory (RAM)) and/or non-volatile (such as read-only memory (ROM), flash memory, etc.). The user device 504 may also include additional storage 516, which may include removable storage and/or non-removable storage. The additional storage 516 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

The memory 512, the additional storage 516, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 512 and the additional storage 516 are all examples of computer-readable storage media. Additional types of computer-readable storage media that may be present in the user devices 504 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the user devices 504. Combinations of any of the above should also be included within the scope of computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user devices 504 may also contain communications connection(s) 518 that allow the user devices 504 to communicate with a stored database, another computing device or server, user terminals and/or other devices on the networks 508. The user devices 504 may also include I/O device(s) 520, such as a keyboard, a mouse, a pen, a voice input device, a touch input device, a display, speakers, a printer, etc.

Turning to the contents of the memory 512 in more detail, the memory 512 may include an operating system 522 and one or more application programs or services for implementing the features disclosed herein including at least an installation module 524, an interface module 526, and a wizard module 528. In some cases, the installation module 524 may be configured to be executed when a technician is attempting to install an energy generation network at a site. One example of an energy generation network is a set of network-tied energy generation devices (e.g., a PV array, an energy generation inverter, and/or a metering device) that can communicate with one or more service provider computers 510 via a wireless gateway. As such, the installation module 524 of the user device 502 may enable communication between the user device 502 and the service provider computers 510 and/or the gateway 506 for collection and/or processing of energy generation network data and/or for providing control signals for instructing the devices of the energy generation network to perform actions (e.g., increase the rate of data transmission, turn off, contact a different router, etc.). In some examples, the interface module 526 may be configured to present or otherwise prepare a UI for presentation (e.g., on a screen of the user device 502). The interface module 526 may enable presentation of data and/or instructions and may also enable a user to input information about the installation or the energy generation network once the installation is complete. Additionally, the wizard module 528 may be configured to walk a user through a series of steps as well as provide questions and receive answers via the interface module 526. In some cases, the wizard module 528 is an executable workflow that is part of the installation module 524, but is only executed when certain conditions are met.

In some aspects, the service provider computers 510 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 510 are executed by one more virtual machines implemented in a hosted computing environment. A hosted computing environment may also be referred to as a cloud computing environment. In some examples, the service provider computers 510 may be in communication with the user devices 502, the gateway device 506, and/or other service providers via the networks 508, or via other network connections. The service provider computers 510 may include one or more servers, perhaps arranged in a cluster, as a server farm, or as individual servers not associated with one another. These servers may be configured to implement management of the connections within the energy generation network described herein as part of an integrated, distributed computing environment.

In one illustrative configuration, the service provider computers 510 may include at least one memory 522 and one or more processing units (or processor(s)) 524. The processor(s) 524 may be implemented as appropriate in hardware, computer-executable instructions, firmware, or combinations thereof. Computer-executable instruction or firmware implementations of the processor(s) 524 may include computer-executable or machine-executable instructions written in any suitable programming language to perform the various functions described.

The memory 522 may store program instructions that are loadable and executable on the processor(s) 524, as well as data generated during the execution of these programs. Depending on the configuration and type of service provider computers 510, the memory 522 may be volatile (such as RAM) and/or non-volatile (such as ROM, flash memory, etc.). The service provider computers 510 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 522 may include multiple different types of memory, such as SRAM, DRAM, or ROM.

Turning to the contents of the memory 522 in more detail, the memory 522 may include an operating system 526 and/or one or more application programs or services for implementing the features disclosed herein including at least an installation module 528 for aiding in performance of the installation module 524. In some examples, the user device 502 may be a thin client device and may mirror the functionality of the installation module 528 running on the service provider computers 510. However, in other examples, the installation module 528 may be in communication with the installation module 524 of the user device, passing data back and forth (almost as a web server to a web client).

The gateway device 506 may also be any type of computing device such as, but not limited to, a router, a mobile phone, a smart phone, a PDA, a laptop computer, a desktop computer, a server computer, a thin-client device, a tablet PC, etc. In some examples, the gateway device 506 may be in communication with the user devices 502 and/or the service providers 510 via the networks 508, or via other network connections.

In one illustrative configuration, the gateway device 506 may include at least one memory 530 and one or more processing units (or processor(s)) 532. The processor(s) 532 may be implemented as appropriate in hardware, computer-executable instructions, firmware, or combinations thereof. Computer-executable instruction or firmware implementations of the processor(s) 532 may include computer-executable or machine-executable instructions written in any suitable programming language to perform the various functions described.

The memory 530 may store program instructions that are loadable and executable on the processor(s) 532, as well as data generated during the execution of these programs. Depending on the configuration and type of gateway device 506, the memory 530 may be volatile (such as RAM) and/or non-volatile (such as ROM, flash memory, etc.). The gateway device 506 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 530 may include multiple different types of memory, such as SRAM, DRAM, or ROM.

Turning to the contents of the memory 530 in more detail, the memory 530 may include an operating system and/or one or more application programs or services for implementing the features disclosed herein including at least routing module 534 for routing energy generation network data between the energy generation network devices and the service provider computers 510 (or, in some cases, directly to the user devices 502).

Figure 6:
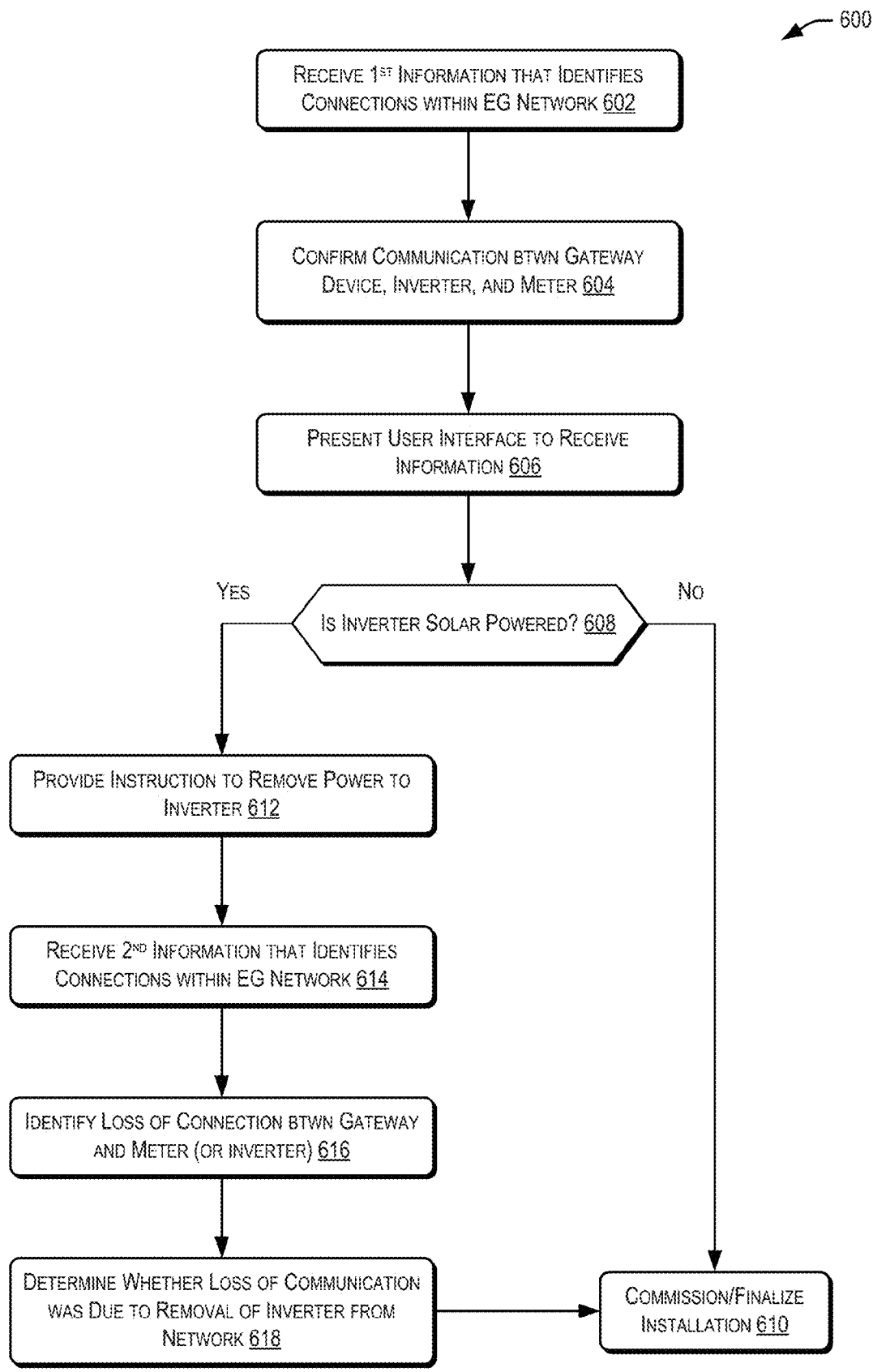
FIG. 6 is a simplified flow diagram illustrating at least one method for managing connectivity in an energy generation network as described herein, according to at least one example.
Figure 7:
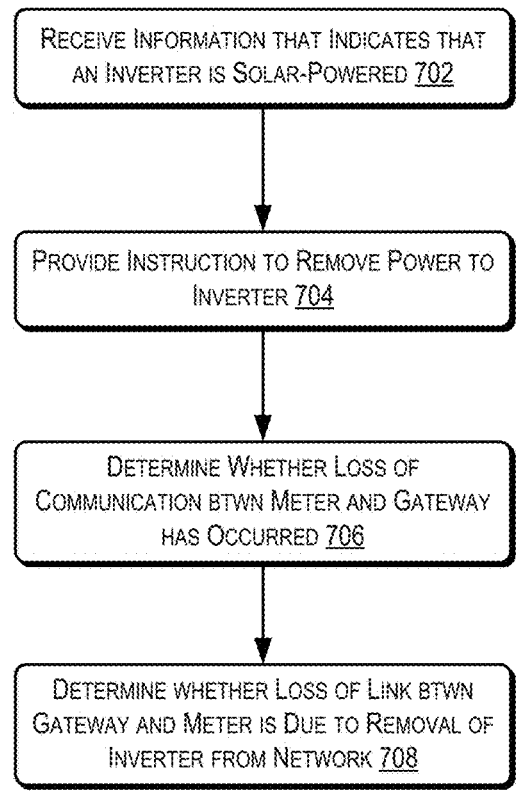
FIG. 7 is another simplified flow diagram illustrating at least one method for managing connectivity in an energy generation network as described herein, according to at least one example.
Figure 8:
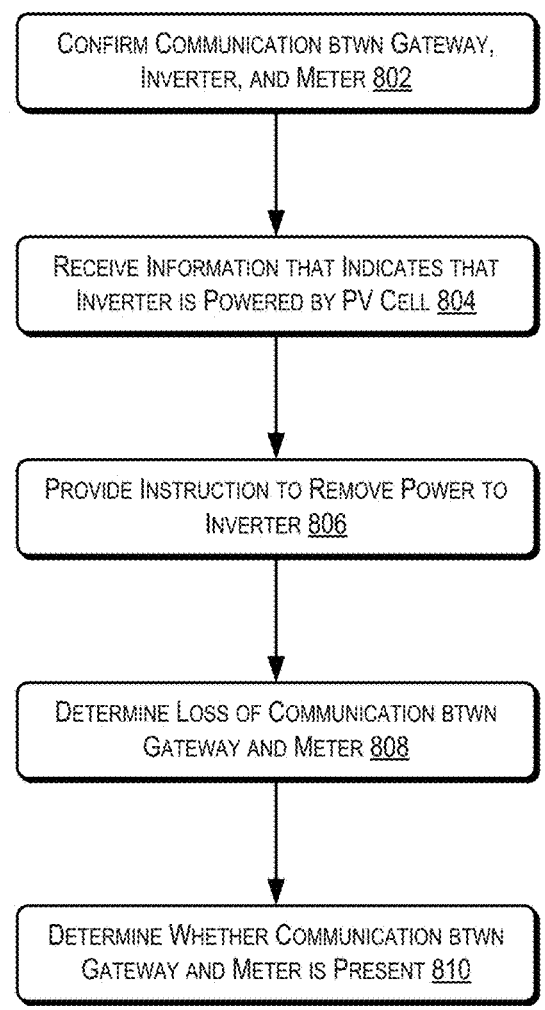
FIG. 8 is another simplified flow diagram illustrating at least one method for managing connectivity in an energy generation network as described herein, according to at least one example.

FIGS. 6, 7, and 8 illustrate example flow diagrams showing respective processes 600, 700, and 800 for managing connections within an energy generation network, as described herein. These processes 600, 700, and 800 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In some examples, one or more processors of the user device 116, 502 or the service provider computers 114, 510 of FIGS. 1 and 5, respectively, may perform method 600 of FIG. 6. Method 600 may begin at 602, where first information that identifies connections within the energy generation network are received. These first information may indicate which devices, within the energy generation system, are connected to which other devices. For example, the first information may indicate that an energy generation inverter is connected to a PV array and a metering device. Additionally, the first information may indicate that the metering device is using the inverter as a router (e.g., a single hop) to transmit the meter data to a gateway device. The first information may also indicate that the inverter is communicating directly with the gateway and/or that the gateway has a wide area network connection (e.g., the Internet). The first information may also indicate model numbers and/or specific device identifiers for each device within the energy generation network. As such, this first information may be received by the service provider computers 510 of FIG. 5 and may be used to understand the nature of the connections within the network (e.g., at a single site). This first information, although collected by the service provider computers 510, may be transmitted to the user device 502 for use with an installation application.

At 604, communication between the gateway device, the inverter, and the meter may be confirmed. This confirmation may be based at least in part on a review of the first information. In some examples, at 606, a user interface may be presented for receiving information about an installation or setup of energy generation devices. The information received by the UI is information that identifies configuration information and/or model information for the devices. For example, with a device model number, it may be determined whether an inverter is AC- or DC-powered. At 608, if it is determined that the inverter is not solar-powered, an instruction may be provided to commission (finalize) the installation at 610. However, if the inverter is solar powered, the wizard application (or sub-routine) may be implemented after 608, where an instruction is provided to remove power to the inverter at 612. In some examples, the instruction may be a visual instruction to a technician (e.g., via the UI) or it may be a control signal sent to the inverter, instructing the inverter to turn itself off.

At 614, second information that identifies connections within the energy generation network may be received. This information may be the same set of data points as received earlier; however, these are received at a later point in time. In particular, this information is received, after power has been removed from the inverter. In this way, it may be detected whether the meter has lost a network connection with the gateway. As noted, at 616, it may be identified whether a loss of connection between the gateway and the meter has occurred. However, in some examples, it may also or alternatively be identified whether a loss of connection between the gateway and the inverter has occurred. This check is to guarantee that the inverter was successfully turned off. Once it has been verified that the inverter is no longer communicatively connected to the gateway, it may be determined whether a loss of communication between the gateway and the meter is due to removal of the inverter from the mesh-connected network at 618. If not, an instruction to install a repeater (range extender) may be provided. Either way, the process 600 may end at 610, where an instruction may be provided to commission the installation.

FIG. 7 illustrates an example flow diagram showing method 700 for managing connections within an energy generation network, as described herein. The one or more processors of the user device 116, 502 or the service provider computers 114, 510 of FIGS. 1 and 5, respectively, may perform method 700 of FIG. 7. Method 700 may begin at 702 by receiving information that indicates that an inverter is solar-powered. If so, a wizard application will likely be launched that can guide a technician or other user through determining (in real-time) whether to install a repeater device at the location (site). At 704, an instruction to remove power to the inverter may be provided. As noted, the instruction may be a control signal provided from the service provider computers to the inverter via a gateway device at the location. At 706, a determination regarding whether loss of communication between the meter (and/or the inverter) and the gateway has occurred may be made. As noted, this may be helpful in verifying that the control signal actually disabled the inverter. In some examples, the process 700 may end at 708, where it may be determined whether the link between the gateway and the meter is lost due to removal of the inverter from the mesh-connected network (e.g., once the inverter has been powered off).

FIG. 8 illustrates an example flow diagram showing method 800 for managing connections within an energy generation network, as described herein. The one or more processors of the user device 116, 502 or the service provider computers 114, 510 of FIGS. 1 and 5, respectively, may perform method 800 of FIG. 8. Method 800 may begin at 802 by confirming communication between a gateway device, an inverter, and a meter that are all installed at a site. At 804, information may be received that indicates that the inverter is powered by a PV array (one or more PV cells). If so, at 806, an instruction to remove power to the inverter may be provided. Once the instruction is provided, in order to verify that power was removed from the inverter (e.g., simulating the scenario when the PV array is not active), it can be determined whether the meter (and/or the inverter) has lost its network connection with the gateway device at 808. At 810, the process 800 may end where it may be determined whether communication between the gateway device and the meter is present.

Figure 9:
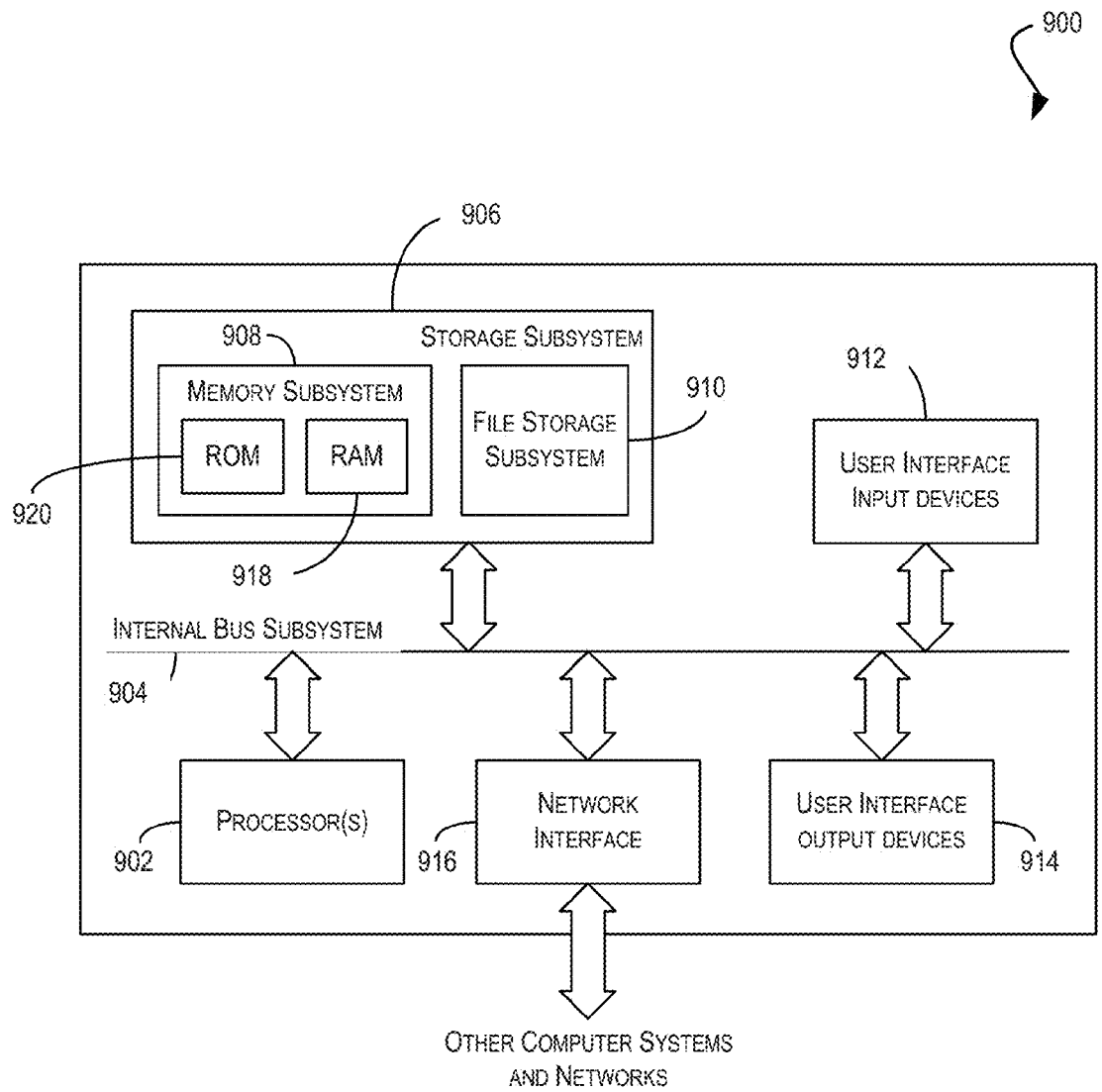
FIG. 9 depicts a simplified block diagram of a computing system for implementing some of the examples described herein, according to at least one example.

FIG. 9 is a simplified block diagram of computer system 900 according to an embodiment of the present disclosure. Computer system 900 can be used to implement any of the computer systems/devices (e.g., user devices 116, 502, service provider 114, 510, gateway devices 110, 506) described with respect to FIGS. 1-5. As shown in FIG. 9, computer system 900 can include one or more processors 902 that communicate with a number of peripheral devices via bus subsystem 904. These peripheral devices can include storage subsystem 906 (comprising memory subsystem 908 and file storage subsystem 910), user interface input devices 912, user interface output devices 914, and network interface subsystem 916.

In some examples, internal bus subsystem 904 can provide a mechanism for letting the various components and subsystems of computer system 900 communicate with each other as intended. Although internal bus subsystem 904 is shown schematically as a single bus, alternative embodiments of the bus subsystem can utilize multiple buses. Additionally, network interface subsystem 916 can serve as an interface for communicating data between computer system 900 and other computer systems or networks (e.g., the networks 112 of FIG. 1 and/or networks 508 of FIG. 5). Embodiments of network interface subsystem 916 can include wired interfaces (e.g., Ethernet, CAN, RS232, RS485, etc.) or wireless interfaces (e.g., ZigBee, Wi-Fi, cellular, etc.).

In some cases, user interface input devices 912 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 900. Additionally, user interface output devices 914 can include a display subsystem, a printer, or non-visual displays such as audio output devices, etc. The display subsystem can be any known type of display device. In general, use of the term "output device" is intended to include all possible types of devices and mechanisms for outputting information from computer system 900.

Storage subsystem 906 can include memory subsystem 908 and file/disk storage subsystem 910. Subsystems 908 and 910 represent non-transitory computer-readable storage media that can store program code and/or data that provide the functionality of embodiments of the present disclosure. In some embodiments, memory subsystem 908 can include a number of memories including a main random access memory (RAM) 918 for storage of instructions and data during program execution and a read-only memory (ROM) 920 in which fixed instructions may be stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and not intended to limit embodiments of the present disclosure. Many other configurations having more or fewer components than system 900 are possible.

Illustrative methods and systems for managing user device connections are described above. Some or all of these systems and methods may, but need not, be implemented at least partially by architectures such as those shown at least in FIGS. 1-9 above. While many of the embodiments are described above with reference to information and/or control signals, it should be understood that any type of electronic content may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of personal computers, such as desktop or laptop computers running a standard operating system, as well as cellular, wireless and handheld devices running mobile software and capable of supporting a number of networking and messaging protocols.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method, comprising:
   receiving, by a mobile computing device at a site connected to an electrical grid, first information that identifies first connections within a mesh-connected energy generation network at the site, the first information received from a server computing device, and the energy generation network comprising:
   a gateway device;
   an energy generation inverter; and
   a metering device;
   confirming, based at least in part on the received first information, communication between the gateway device and the metering device;
   providing, by the mobile computing device, an instruction to remove power to the energy generation inverter;
   receiving, from the server computing device, second information that identifies second connections within the mesh-connected energy generation network;

identifying, based at least in part on the second information, a loss of communication between the gateway device and the metering device;

determining, based at least in part on the second information and the loss of communication between the gateway device and the metering device, whether the loss of communication was due to removal of the energy generation inverter from the mesh-connected energy generation network;

providing, via a user interface, an instruction to establish a communication link between the gateway device and the metering device when the communication link between the gateway device and the metering device is not detected, the instruction to establish the communication link including identification of a repeater device for establishing the communication link;

receiving an identifier of the repeater device;

providing the identifier of the repeater device to the server computing device; and causing the server computing device to associate the identifier of the repeater device with the installation.

2. The method of claim 1, further comprising determining whether the energy generation inverter is powered only by photovoltaic energy of the energy generation network.

3. A computing device, comprising:

a memory configured to store computer-executable instructions; and a processor configured to access the memory and execute the computer-executable instructions to implement an application for confirming communication between a metering device and a gateway device at an installation, the application configured to:

receive first information that identifies first connections within a mesh-connected energy generation network at the site, the first information received from a server computing device;

confirm, based at least in part on the received first information, communication between the gateway device and the metering device;

provide an instruction to remove power to the energy generation inverter;

receive, from the server computing device, second information that identifies second connections within the mesh-connected energy generation network;

identify, based at least in part on the second information, a loss of communication between the gateway device and the metering device;

determine, based at least in part on the second information and the loss of communication between the gateway device and the metering device, whether the loss of communication was due to removal of the energy generation inverter from the mesh-connected energy generation network;

provide, via a user interface, an instruction to establish a communication link between the gateway device and the metering device when the communication link between the gateway device and the metering device is not detected, the instruction to establish the communication link including identification of a repeater device for establishing the communication link;

receive an identifier of the repeater device;

provide the identifier of the repeater device to the server computing device; and cause the server computing device to associate the identifier of the repeater device with the installation.

4. The computing device of claim 3, wherein the instruction to remove power to the energy generation inverter is provided via a user interface of the application.

5. The computing device of claim 3, wherein the instruction to remove power to the energy generation inverter is provided to the energy generation inverter.

6. The computing device of claim 3, wherein the first information indicates that the energy generation inverter is powered by a photovoltaic cell, and wherein the first information comprises an identifier of the energy generation inverter or an identifier of the installation.

7. The computing device of claim 3, wherein the determination of whether a loss of communication between the gateway device and the metering device has occurred is based at least in part on connection information received from the server computing device in communication with at least the gateway device.

8. The computing device of claim 3, wherein the determination of whether a loss of communication between the gateway device and the metering device has occurred is based at least in part on network information that identifies a number of network hops between the gateway device and the metering device.

9. The computing device of claim 3, wherein the application is further configured to receive network information associated with the installation that indicates whether the communication link between the gateway device and the metering device is present.

10. A non-transitory computer-readable medium storing computer-executable instructions for confirming communication between a metering device and a gateway device at an installation that, when executed by a computer system, configure the computer system to perform operations comprising:

receiving first information that identifies first connections within a mesh-connected energy generation network at the site, the first information received from a server computing device;

confirming, based at least in part on the received first information, communication between the gateway device and the metering device;

providing an instruction to remove power to the energy generation inverter;

receiving, from the server computing device, second information that identifies second connections within the mesh-connected energy generation network;

identifying, based at least in part on the second information, a loss of communication between the gateway device and the metering device;

determining, based at least in part on the second information and the loss of communication between the gateway device and the metering device, whether the loss of communication was due to removal of the energy generation inverter from the mesh-connected energy generation network;

providing, via a user interface, an instruction to establish a communication link between the gateway device and the metering device when the communication link between the gateway device and the metering device is not detected, the instruction to establish the communication link including identification of a repeater device for establishing the communication link;

receiving an identifier of the repeater device;

providing the identifier of the repeater device to the server computing device; and causing the server computing device to associate the identifier of the repeater device with the installation.

11. The non-transitory computer-readable medium of claim 10, wherein the instruction to remove power to the energy generation inverter is provided to the energy generation inverter or via the user interface of a mobile application.

12. The non-transitory computer-readable medium of claim 10, wherein the determination of whether a loss of communication between the gateway device and the metering device has occurred is based at least in part on connection information received from the server computing device in communication with at least the gateway device or network information that identifies a number of network hops between the gateway device and the metering device.

13. The non-transitory computer-readable medium of claim 10, wherein the operations further comprise receiving network information associated with the installation that indicates whether the communication link between the gateway device and the metering device is present.

* * * * *